(12) United States Patent
Wessels

(10) Patent No.: US 12,280,958 B2
(45) Date of Patent: Apr. 22, 2025

(54) ADJUSTABLE BLOCK ASSEMBLIES AND METHODS FOR CONVEYOR SYSTEM ADJUSTMENT

(71) Applicant: INTELLIGRATED HEADQUARTERS, LLC, Mason, OH (US)

(72) Inventor: Eric Wessels, West Chester, OH (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 191 days.

(21) Appl. No.: 18/058,326

(22) Filed: Nov. 23, 2022

(65) Prior Publication Data

US 2024/0166447 A1   May 23, 2024

(51) Int. Cl.
*B65G 15/60*   (2006.01)

(52) U.S. Cl.
CPC .................................... *B65G 15/60* (2013.01)

(58) Field of Classification Search
None
See application file for complete search history.

(56) References Cited

U.S. PATENT DOCUMENTS

| | | | | |
|---|---|---|---|---|
| 4,177,684 A | * | 12/1979 | White | F16H 55/30 474/902 |
| 4,362,005 A | * | 12/1982 | Hanaway | B65G 23/44 56/DIG. 15 |
| 8,807,331 B2 | * | 8/2014 | Beltman | B65H 5/021 198/813 |
| 8,960,415 B2 | * | 2/2015 | Simonsen | B32B 37/1054 198/782 |
| 10,174,817 B2 | * | 1/2019 | Cederstrand | F16H 7/0848 |
| 11,866,266 B2 | * | 1/2024 | Schwanitz | B65G 23/44 |

FOREIGN PATENT DOCUMENTS

| | | | | |
|---|---|---|---|---|
| EP | 4321457 A1 | * | 2/2024 | B65G 39/16 |
| JP | 2016-013920 A | | 1/2016 | |

* cited by examiner

*Primary Examiner* — Kavel Singh
(74) *Attorney, Agent, or Firm* — Alston & Bird LLP

(57) ABSTRACT

Methods, apparatuses, systems, assemblies, and/or the like are provided. An adjustable block assembly may include an outer block with a first engagement surface; a wedge block including a first slidable mounting component and a second engagement surface configured to engage the first engagement surface; an inner block with a second slidable mounting component configured to operably engage with the first slidable mounting component; and an adjustment mechanism configured to adjust the distance between the outer block and the inner block along a first direction by translating the wedge block relative to both the outer block and the inner block along a second direction. The second direction is different than the first direction. Translating the wedge block may cause the second engagement surface to slide relative to the first engagement surface, and the first slidable mounting component to slide relative to the second slidable mounting component.

20 Claims, 12 Drawing Sheets

ADJUSTABLE BLOCK ASSEMBLIES AND METHODS FOR CONVEYOR SYSTEM ADJUSTMENT

TECHNICAL FIELD

The present disclosure relates generally to shaft adjustment for conveyor systems. In particular, it relates to adjustable block assemblies for adjusting shafts in conveyor systems.

BACKGROUND

In modern production, industrial, and distribution environments, conveyor systems are often used for sorting various components. For example, a shoe sorter may transport components via a conveyor having metal slats, with divert shoes moving diagonally across the conveyor to push various components into associated takeaway lines. The slats are connected by one or more chains that are driven by one or more sprockets connected to a shaft assembly, and the slats or other conveyor surface may be aligned (e.g., perpendicular) to the direction of movement of the conveyor to avoid binding and/or unnecessary wear.

Achieving this initial orientation may require fine-tuning of the conveyor, which may be time consuming and labor intensive. Over time, the position of the conveyor components may shift, causing the slats to become misaligned and negatively affecting the performance of the conveyor system. This may occur, for example, as one or more of the chains "slacks" over time. In some instances, one chain may wear out and develop slack at a faster rate than another chain, compounding the misalignment issue. Realigning the shaft assembly may require a trial-and-error procedure of removing and/or repositioning one or more components of the conveyor assembly, a potentially time-consuming and cumbersome procedure. A need therefore exists to precisely adjust a conveyor system accurately and efficiently.

Through applied effort, ingenuity, and innovation, Applicant has solved problems relating to adjustment mechanisms, components, assemblies, and methods for conveyor systems.

SUMMARY

In general, embodiments of the present disclosure provide methods, apparatuses, systems, assemblies, and/or the like.

According to various embodiments, there is provided an adjustable block assembly including an outer block comprising a first engagement surface. In some embodiments, the adjustable block assembly includes a first slidable mounting component and a second engagement surface configured to engage the first engagement surface. In some embodiments, the adjustable block assembly includes an inner block including a second slidable mounting component configured to operably engage with the first slidable mounting component. In some embodiments, the adjustable block assembly includes an adjustment mechanism configured to adjust the distance between the outer block and the inner block along a first direction by translating the wedge block relative to both the outer block and the inner block along a second direction, wherein the second direction is different than the first direction, wherein translating the wedge block is configured to cause the second engagement surface of the wedge block to slide relative to the first engagement surface of the outer block, and the first slidable mounting component of the wedge block to slide relative to the second slidable mounting component of the inner block.

In some embodiments, the adjustable block assembly includes a mounting block, wherein the inner block is fixed to the mounting block, and wherein the mounting block and the inner block are configured to move together along the first direction.

In some embodiments, on the one hand, the first attachment section is a dovetail rail and the second attachment section is a dovetail mount, or, on the other hand, the first attachment section is a dovetail mount and the second attachment section is a dovetail rail.

In some embodiments, the adjustment mechanism includes a threaded shaft configured to operably connect the outer block and the wedge block to cause translation of the wedge block.

In some embodiments, the wedge block includes a threaded section configured to receive the adjustment mechanism and the outer block further includes a clearance hole.

In some embodiments, the first and second engagement surfaces include angled surfaces, which are angled relative to the first direction.

According to various embodiments, there is provided a conveyor system including a shaft assembly including a shaft and two bearings, wherein the shaft is operably connected to the two bearings. In some embodiments, the conveyor system includes a conveyor assembly configured to be driven by the shaft. In some embodiments, the conveyor system includes two adjustable block assemblies, each connected to a respective one of the two bearings. In some embodiments, each adjustable block assembly includes an outer block including a first engagement surface; a wedge block including a first slidable mounting component and a second engagement surface configured to engage the first engagement surface; an inner block including a second slidable mounting component configured to operably engage with the first slidable mounting component; and an adjustment mechanism configured to adjust the distance between the outer block and the inner block along a first direction by translating the wedge block relative to both the outer block and the inner block along a second direction, wherein the second direction is different than the first direction, wherein translating the wedge block is configured to cause: the second engagement surface of the wedge block to slide relative to the first engagement surface of the outer block, and the first slidable mounting component of the wedge block to slide relative to the second slidable mounting component of the inner block, wherein the inner block is fixedly connected, directly or indirectly, to the respective one of the two bearings.

In some embodiments, each outer block of the two adjustable block assemblies is configured to be stationary relative to a frame of the conveyor system during translation of the wedge block, and wherein the inner block is configured to translate relative to the outer block and the frame during translation of the wedge block.

In some embodiments, the first direction is parallel to a top surface of the conveyor assembly.

In some embodiments, the conveyor assembly further includes two or more slats operatively connected by one or more chains In some embodiments, the two adjustable block assemblies are independently adjustable to align the shaft with one or more of the conveyor assembly and the frame.

In some embodiments, on the one hand, the first attachment section of each adjustable block assembly is a dovetail rail and the second attachment section of each adjustable block assembly is a dovetail mount, or, on the other hand, the first attachment section of each adjustable block assembly is a dovetail mount and the second attachment section of each adjustable block assembly is a dovetail rail.

In some embodiments, the adjustment mechanism includes a threaded shaft configured to operably connect the outer block and the wedge block to cause translation of the wedge block.

In some embodiments, the conveyor system includes two mounting blocks, wherein each inner block of the two adjustable block assemblies is fixed to a respective one of the two mounting blocks, and wherein each inner block and each respective mounting block are configured to move together.

In some embodiments, each of the two mounting blocks includes a respective pair of fasteners, wherein the respective pair of fasteners is configured to engage a respective bearing of the two bearings during translation of the wedge block.

In some embodiments, each bearing of the two bearings is fixedly connected to a respective mounting block and configured to move with the respective mounting block.

In some embodiments, the two mounting blocks are attached to a frame member of the conveyor system, and wherein each mounting block of the two mounting blocks is slidable relative to the frame member during translation of the respective wedge block of the two block assemblies.

In some embodiments, the frame member includes at least one slot and each mounting block of the two mounting blocks includes at least one hole, wherein the at least one slot and the at least one hole are each configured to receive at least one fastener connecting the respective bearing of the two bears to the frame member and the respective mounting block.

According to various embodiments, there is provided a method of adjusting a shaft for a conveyor system. In some embodiments, the conveyor system includes two adjustable block assemblies, each connected to a respective one of the two bearings. In some embodiments, each adjustable block assembly includes an outer block including a first engagement surface; a wedge block including a first slidable mounting component and a second engagement surface configured to engage the first engagement surface; an inner block including a second slidable mounting component configured to operably engage with the first slidable mounting component; and an adjustment mechanism configured to adjust the distance between the outer block and the inner block along a first direction by translating the wedge block relative to both the outer block and the inner block along a second direction, wherein the second direction is different than the first direction, wherein translating the wedge block is configured to cause: the second engagement surface of the wedge block to slide relative to the first engagement surface of the outer block, and the first slidable mounting component of the wedge block to slide relative to the second slidable mounting component of the inner block, wherein the inner block is fixedly connected, directly or indirectly, to the respective one of the two bearings. In some embodiments, the method includes slidably moving the second engagement surface of the wedge block relative to the first engagement surface of the outer block. In some embodiments, the method includes slidably moving the first slidable mounting component of the wedge block relative to the second slidable mounting component of the inner block.

In some embodiments, the method further includes measuring a first distance between a first one of the two bearings and a first predetermined location on a frame of the conveyor assembly. In some embodiments, the method includes measuring a second distance between the second one of the two bearings and a second predetermined location on the frame of the conveyor assembly, wherein the second predetermined location corresponds to the first predetermined location. In some embodiments, the method includes adjusting, by means of the wedge block, one of the two bearings to make the first and second distances equal.

The above summary is provided merely for purposes of summarizing some example embodiments to provide a basic understanding of some embodiments of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF SOME EXAMPLE EMBODIMENTS

Figure 1:
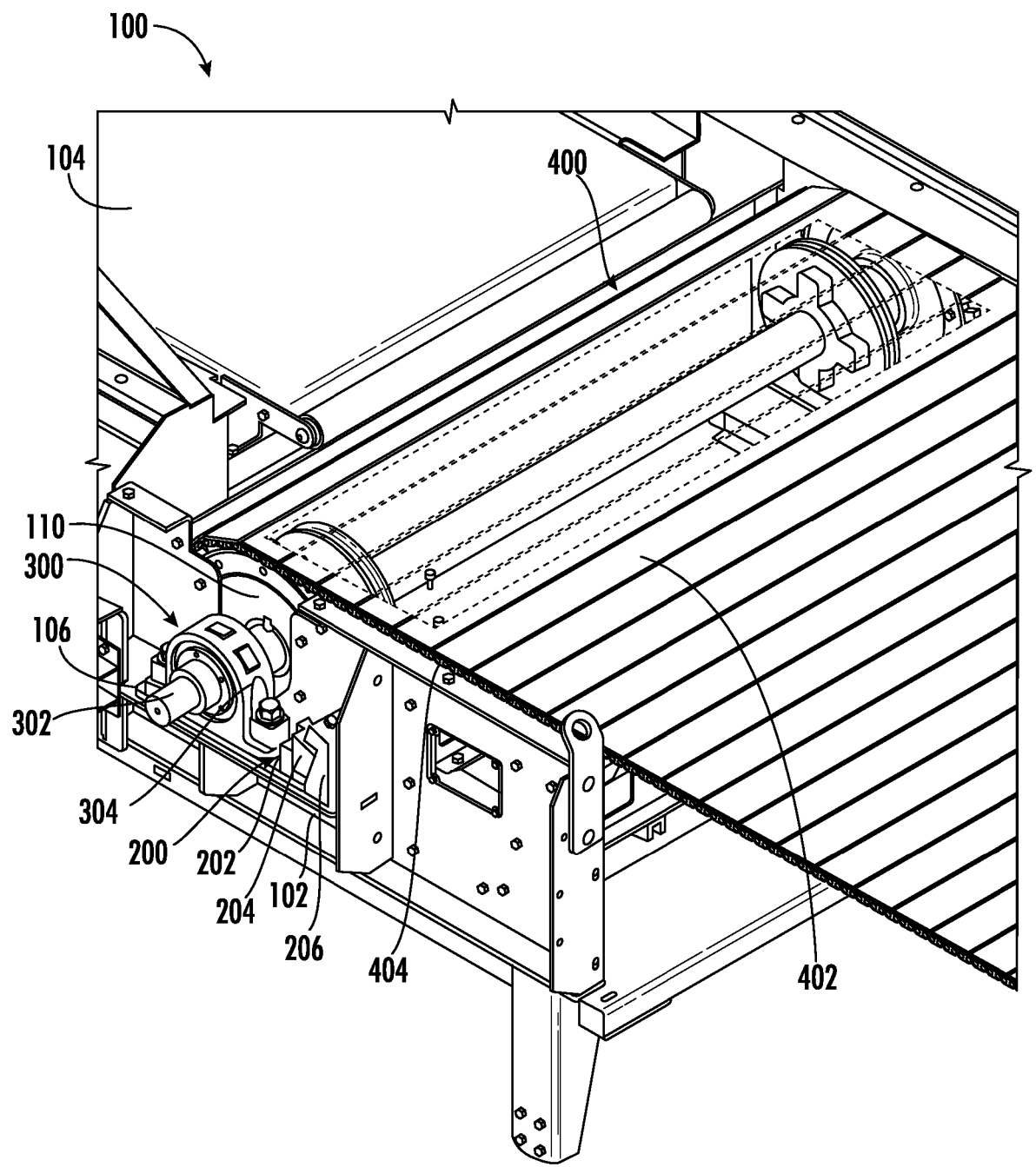
FIG. 1 is an angled view of an example conveyor system in accordance with various embodiments of the present disclosure.
Figure 2:
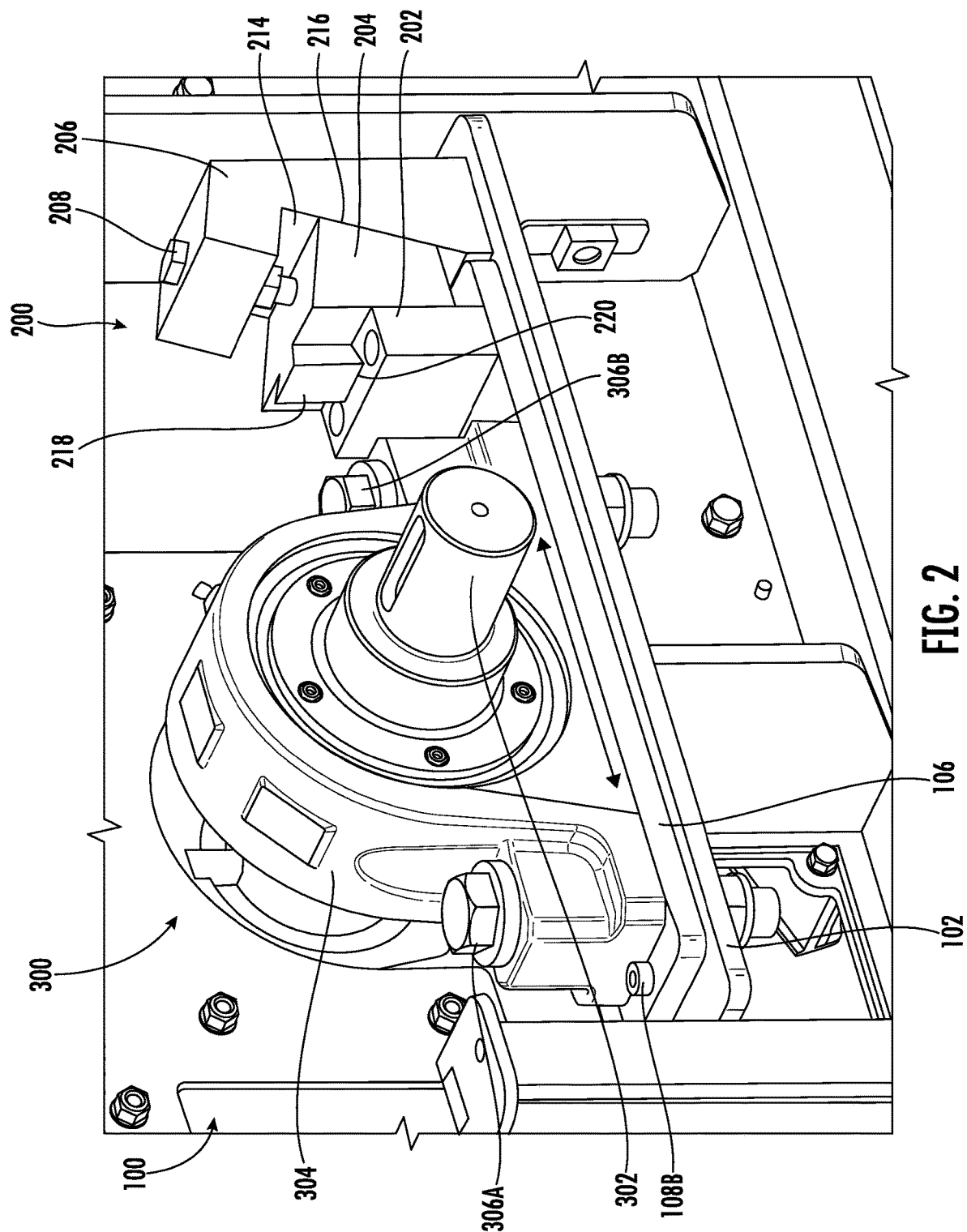
FIG. 2 is a first angled view of an example wedge block assembly and shaft assembly in accordance with various embodiments of the present disclosure.
Figure 3:
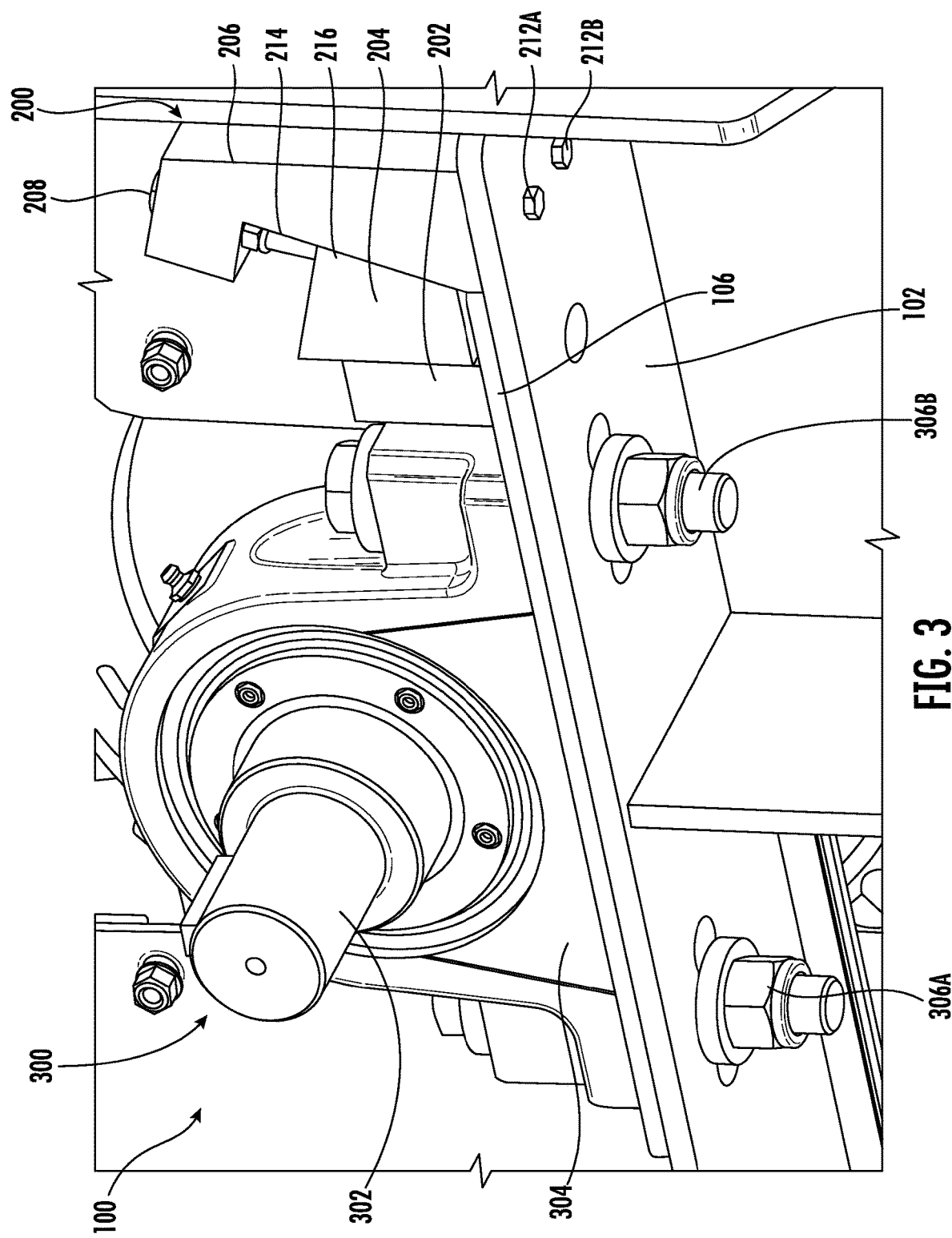
FIG. 3 is a second angled view of an example wedge block assembly and shaft assembly in accordance with various embodiments of the present disclosure.

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily refer to the same embodiment).

Overview

The present disclosure relates to conveyor systems used in production, industrial, and distribution environments to move materials from one location to another. For example, a shoe sorter may transport components via a conveyor having metal slats, with divert shoes moving diagonally across the conveyor to push various components into associated takeaway lines. The slats are connected by one or more chains that are driven by one or more sprockets, and the shafts are aligned by a shaft assembly that includes a shaft connected to opposing bearing plates, with the shaft operably connected to the one or more sprockets. Over time, the position of the shaft assembly may shift, causing the slats to become misaligned, negatively affecting the performance of the conveyor system. This may occur, for example, as one or more of the chains "slacks" over time due to operational wear-and-tear (e.g., due to friction or imbalances between the sprockets). In some instances, one chain may wear out and develop slack at a faster rate than another chain, compounding the misalignment issue. Furthermore, the initial alignment of the shaft and the slats may also present similar issues for technicians operating a conveyor.

To realign the shaft (or to align the shaft at setup), an adjustable block assembly may be positioned on opposed sides of the conveyor system (that is, opposed sides of the shaft and/or conveyor slats or other conveyor medium) and configured to engage a respective bearing. An adjustable block assembly may include: an outer block that may be fixed to the frame of the conveyor system; a wedge block that may be operably connected to the outer block by an adjustment mechanism and also configured to engage with the outer block along at least one surface; and an inner block that has a slidable mounting component configured to engage with and corresponding to a slidable mounting component on the wedge block. The inner block may be movable relative to the outer block. For example, the inner block may be fixedly attached to a mounting block, but, unlike the outer block, the inner block may not be fixed to the frame of the conveyor and may be configured to slidably move with the mounting block. The bearing of the shaft assembly may be operably attached to the mounting block, and may also slide with the mounting block and the inner block. Hence, slidably moving the inner block of the adjustable block assembly may slidably move the mounting block and the bearing, which may thereby adjust the shaft and realign the slats of the conveyor system.

To perform this slidable movement of the inner block, an adjustment mechanism operably connecting the outer block to the wedge block may adjust the position of the wedge block relative to the outer block. Manipulating the adjustment mechanism may cause the wedge block to slide relative to the outer block along the engaged surface and simultaneously cause the slidable mounting component of the wedge block to slide relative to the corresponding slidable mounting component of the inner block. These simultaneous movements may cause the inner block to slidably move toward or away from the outer block, depending on the direction in which the adjustment mechanism is manipulated. In some embodiments, the adjustment mechanism is a threaded bolt engaged with a threaded bolt hole in the wedge block and operably connected to the outer block (e.g., extending through a clearance hole therein). An operator may cause the inner block to slide toward the outer block by "tightening" the bolt or may cause the inner block to slide away from the outer block by "loosening" the bolt. "Tightening" the bolt may cause the wedge block to slide axially along the adjustment mechanism away from the frame, while "loosening" the bolt may cause the wedge block to slide axially along the adjustment mechanism toward the frame. As the wedge block slides away from the frame, the slidable mounting components operably connecting the wedge block with the inner block causes the inner block to slide toward the outer block, and vice-versa as the wedge block slides toward the frame. This "tightening" and "loosening" mechanism will be described in greater detail later in this disclosure. While examples are described with the adjustment mechanism operably coupled between the outer block and the wedge block, it will be appreciated that the adjustment mechanism may be additionally or alternatively operably connected to the inner block or another feature of the conveyor system to adjust the distance between the outer block and the inner block along a first direction by translating the wedge block relative to both the outer block and the inner block along a second direction. In some embodiments, the adjustable block assembly 200 may be configured to translate the bearing 304 in the first direction along a first axis of movement, which may be in either of a forward or rearward direction relative to the conveyor system (e.g., slackening or tightening the chains). Simultaneous movement of all adjustable block assemblies 200 attached to a shaft 302 may be configured to translate the entire shaft in the first direction along the axis.

To ensure that the shaft assembly is properly aligned, an operator may measure the distance from each bearing relative to corresponding positions on the frame. If the distances are not equal, then the slats may be determined to be misaligned and the shaft assembly may require realignment. An operator may then perform the aforementioned adjustment of the adjustable block assembly to slidably move the bearing. After this adjustment, an operator may repeat the measurement of the distance from each bearing relative to the corresponding positions on the frame. An operator may repeat adjustment of the adjustable block assembly until these distances are equal and the shaft assembly has been sufficiently aligned. An operator may also see when the slats have been misaligned when the one or more chains are no longer perpendicular with the shaft. In various embodiments, the alignment process may be configured to ensure that the conveyor (e.g., the slats or other conveyor medium) is aligned with the intended path of the conveyor and the surrounding frame.

These various systems, assemblies, and components will now be described in greater detail and in reference to the various figures included in this disclosure.

Example Conveyor Systems, Adjustable Block Assemblies, and Shaft Assemblies

Referring now to FIG. 1, an angled view of an example conveyor system 100 is shown, according to various embodiments. In some embodiments, the system 100 includes an adjustable block assembly 200 including an inner block 202, a wedge block 204, and an outer block 206; a shaft assembly 300 including a shaft 302 and a pair of bearings 304 operably connected to the shaft 302 and positioned on either side of the shaft 302 (e.g., while portions of the shaft may, but are not required to, extend beyond the outer edge of either bearing as shown in the depicted embodiment), and a conveyor assembly 400 including a plurality of slats 402 and one or more chains 404. These assemblies and their various components will be described in greater detail later in the disclosure. In some embodiments, the system 100 includes a frame 102, to which one or more assemblies or their various components may be fixedly attached. In some embodiments, the conveyor system 100 may have a top surface 104, which may be used as a reference point for which one or more of the shaft assembly 300 or the conveyor assembly 400 may be aligned.

In some embodiments, the conveyor assembly 400 may include a plurality of slats 402 operably connected by one or more chains 404 driven by one or more respective sprockets 110. In some embodiments, the slats 402 may be wood or may be metal, such as steel or aluminum. In some embodiments, the chains 404 may be made of metal, such as steel. In some embodiments, the conveyor assembly 400 may be configured to sort or distribute one or more components, such as in a shoe sorter system having one or more shoes disposed on one or more of the slats to push objects perpendicular to the direction of travel of the conveyor. In some embodiments, the conveyor assembly 400 may be aligned with the shaft assembly 300 by one or more sprockets 110. The one or more sprockets 110 may include one or more drive gears (e.g., connected to a motor) and one or more idler gears. In some embodiments, the system 100 may include a mounting block 106 that is operably connected to one or more of the adjustable block assembly 200 and the shaft assembly 300. In some embodiments, the one or more chains 404 may be operably connected to the one or more sprockets 110. In some embodiments, the one or more chains 404 may be interlocked with the sprockets 110 and positioned perpendicularly to the shaft 302.

While one adjustable block assembly 200 is shown in the figures, it will be understood that another adjustable block assembly 200 may be disposed on the other side of the system 100, and may mirror the structure of the illustrated adjustable block assembly. Similarly, while one side of the shaft assembly 300 with one bearing 304 is shown in the figures, it will be understood that another bearing may be disposed on the other side of the shaft 302, such that two bearings are operably attached to the shaft 302 to support either side of the conveyor assembly 400. Generally, the figures showing and the description referring to one side of the system 100 may be understood as being substantially duplicated on the other side of the system 100, unless described as otherwise in this disclosure.

As shown in FIGS. 2-5, an example adjustable block assembly 200 and an example shaft assembly 300 is shown, according to various embodiments. As shown in FIGS. 6-10, the adjustable assembly 200 (along with the frame 102 and mounting block 106) is shown in greater detail. The adjustable block assembly 200 and the shaft assembly 300 will now be described in greater detail in reference to FIGS. 2-10.

Figure 4:
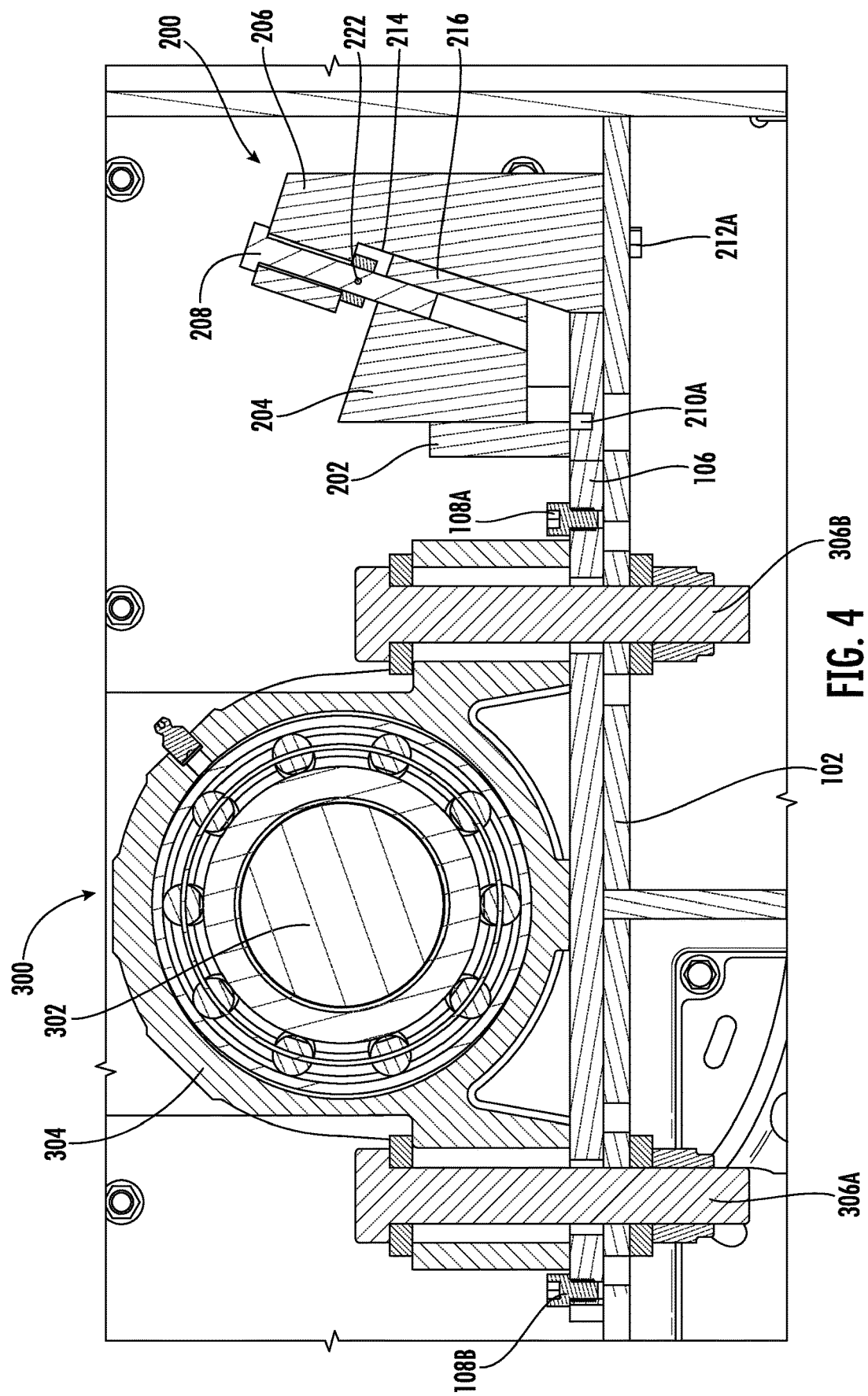
FIG. 4 is a side cross-sectional view of an example wedge block assembly and shaft assembly in accordance with various embodiments of the present disclosure.
Figure 7:
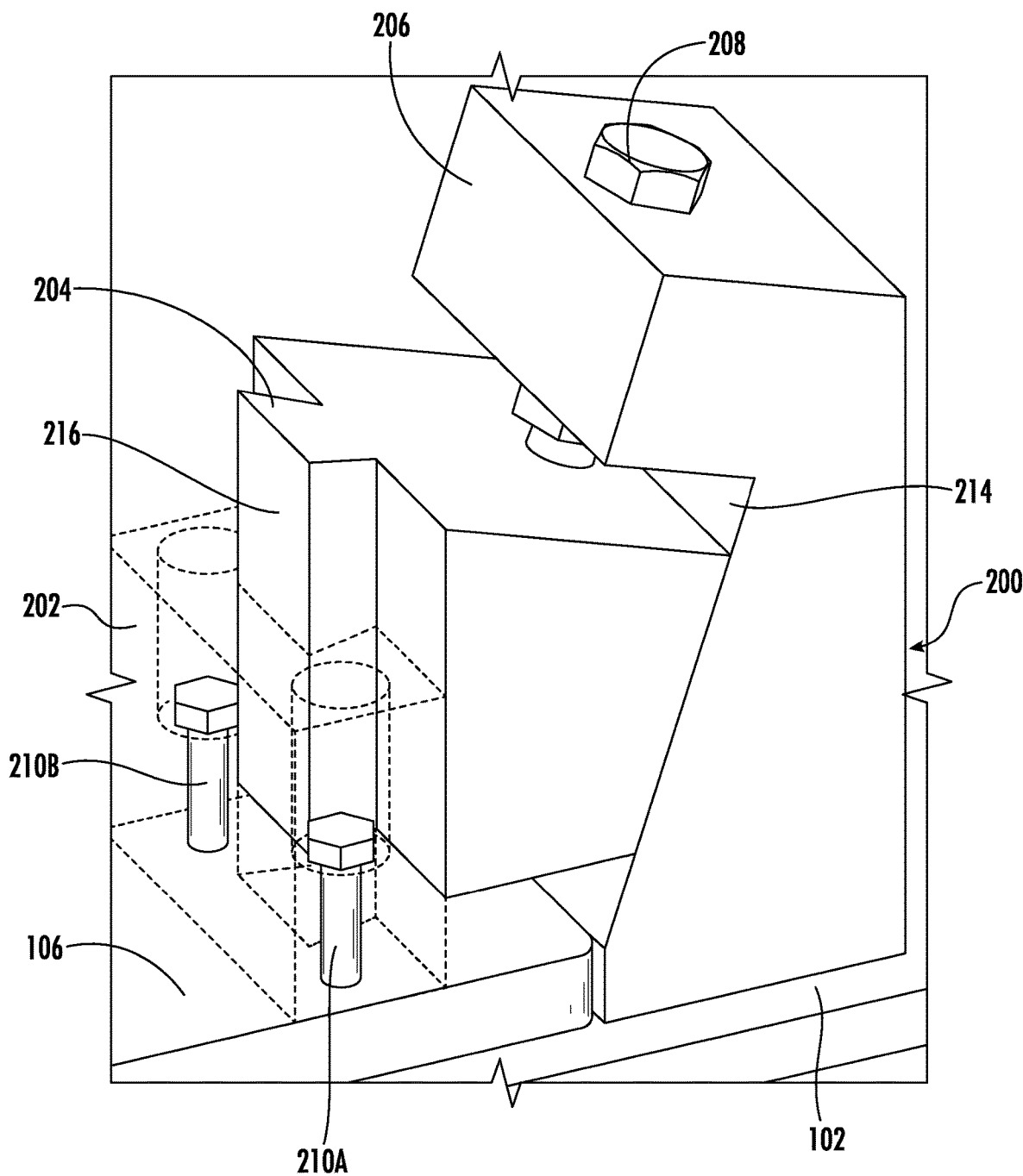
FIG. 7 is an angled view of an example wedge block assembly in accordance with various embodiments of the present disclosure having a transparent inner block.
Figure 8:
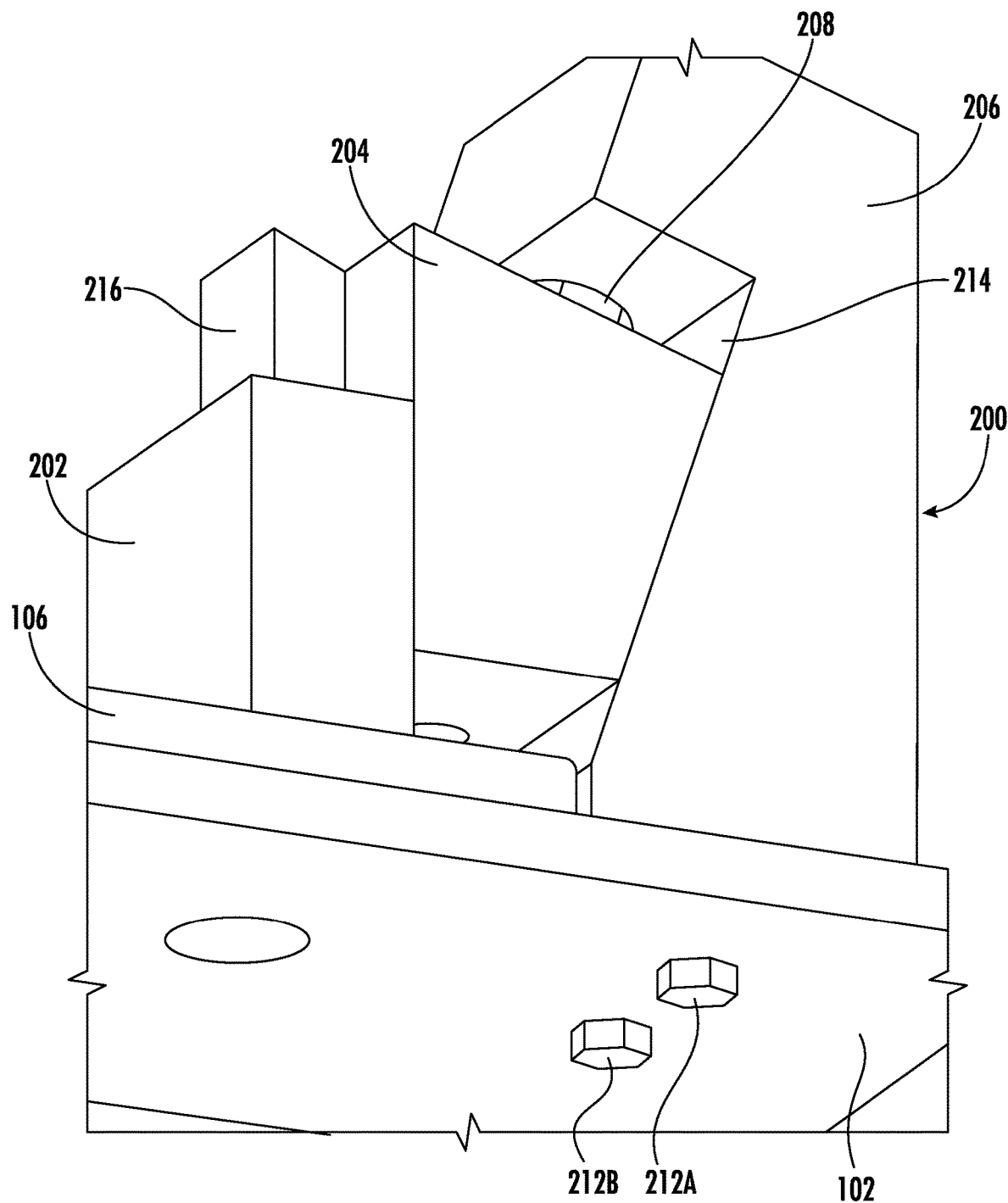
FIG. 8 is a second angled view of an example wedge block assembly in accordance with various embodiments of the present disclosure.
Figure 9:
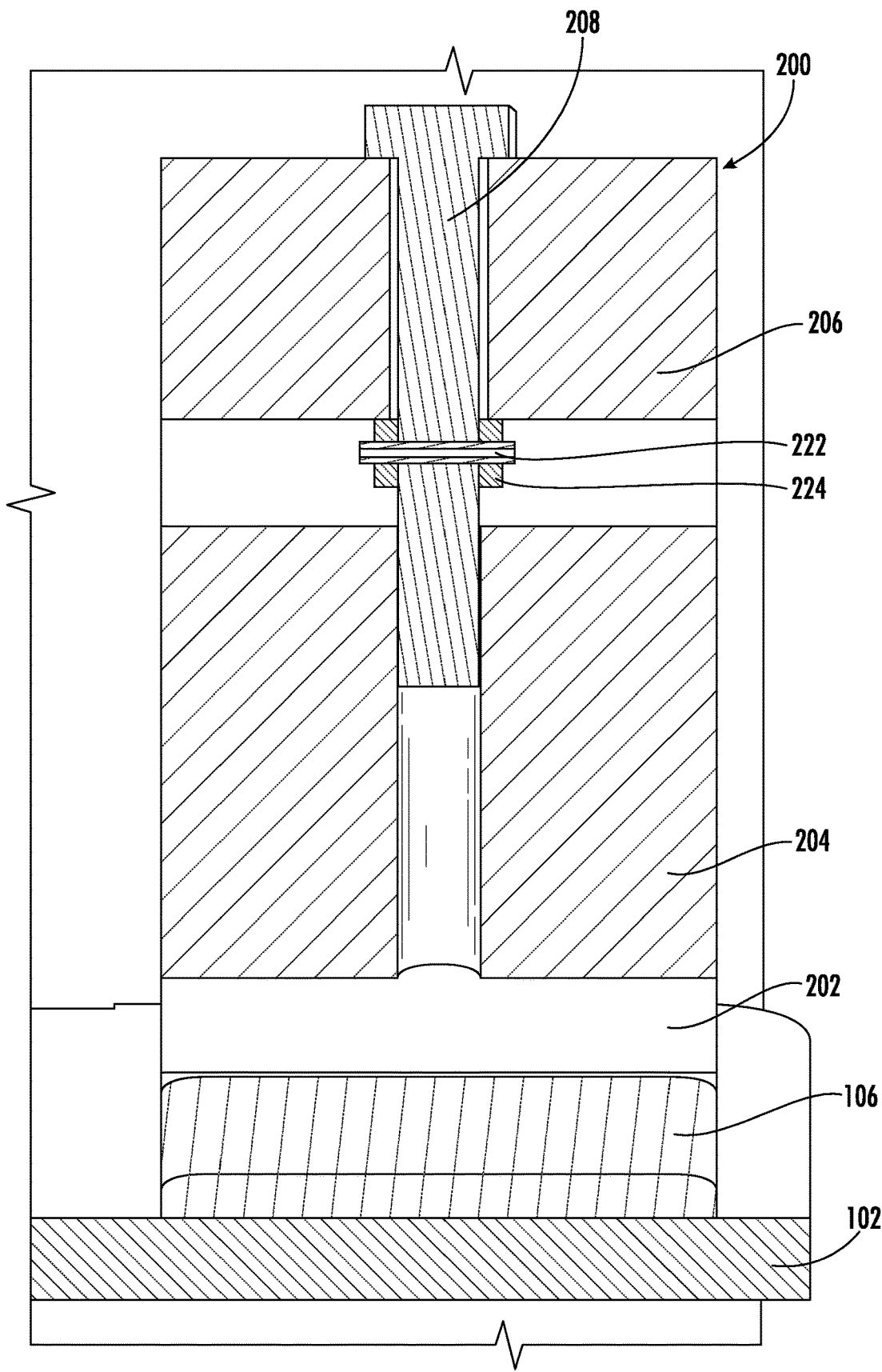
FIG. 9 is a front, cutaway view of an example wedge block assembly in accordance with various embodiments of the present disclosure.
Figure 10:
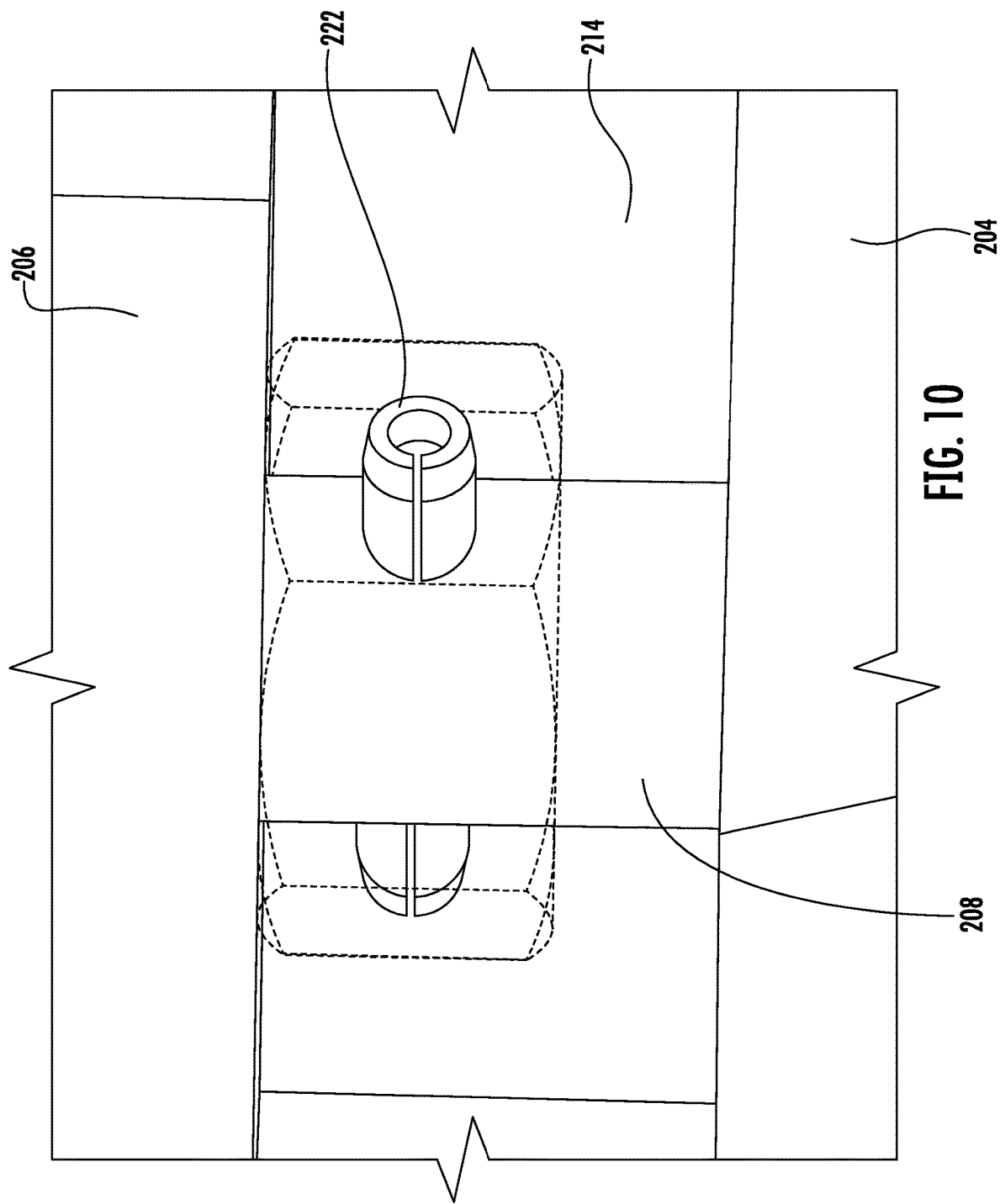
FIG. 10 is an angled view of an example wedge block assembly in accordance with various embodiments of the present disclosure having a transparent inner block.

In some embodiments, the adjustable block assembly 200 may include an inner block 202, a wedge block 204, and an outer block 206. In some embodiments, the adjustable block assembly 200 may also include an adjustment mechanism 208. In some embodiments, the wedge block 204 and outer block 206 may be operably connected by the adjustment mechanism 208. In some embodiments, the adjustment mechanism 208 may be a bolt. In some embodiments, the bolt may be threaded and configured to operably engage with a threaded hole in the wedge block 204. The adjustment mechanism 208 may be disposed in a hole in the outer block 206. In some embodiments, the inner block 202 may be fixedly attached to or otherwise fixedly integrated with the mounting block 106 (e.g., by one or more inner block bolts 210A, 210B, as shown in FIGS. 4, 5, and 7). In some embodiments, the outer block 206 may be fixedly attached to the frame 102 of the conveyor system 100 or otherwise held stationary relative to the frame (e.g., by a pair of bolts 212A, 212B, as shown in FIGS. 3, 4, 6, and 8). In some embodiments, the outer block 206 may have a first engagement surface 214 configured to engage with a second engagement surface 216 of the wedge block 204. The engagement surfaces 214, 216 are planar surfaces angled relative to each other such that the wedge block 204 slidably moves along the outer block 206 during manipulation of the adjustment mechanism 208. Furthermore, during this sliding movement, the wedge block 204 may move axially along the adjustment mechanism 208. In some embodiments, the wedge block 204 may include a first slidable mounting component 218 that is configured to operably engage with a second slidable mounting component 220 of the inner block 202. In some embodiments, one of the first or second slidable mounting component 218, 220 may be a dovetail rail while the other of the first or second mounting component 218, 220 may be a dovetail mount. In some embodiments, the inner block 202, the wedge block 204, and the outer block 206 may be connected to each other such that they remain connected, even if sliding relative to each other, under forces in both directions along an axis of adjustment of the bearing (e.g., in the depicted embodiment, the adjustment mechanism 208 provides such a connection between the outer block and wedge block, while the dovetail connection provides such a connection between the inner block and the wedge block). In some embodiments, any other structure may provide the connection (e.g., T-channel assemblies, etc.). In some embodiments, and as shown in FIGS. 4, 6, 9, and 10, a pin 222 may be operably attached to the adjustment mechanism 208. When the adjustment mechanism 208 is a bolt, according to some embodiments, the pin 222 may be inserted through a nut 224 operably attached to the bolt 208. In some embodiments, the pin 222 may cooperate with the nut to maintain the position of the adjustment mechanism 208 relative to the other component of the adjustable block assembly 200 (e.g., relative to the outer block 206). The nut and/or pin may permit the bolt 208 to rotate freely relative to the clearance hole (e.g., the clearance hole of the outer block 206 in the depicted embodiment). As the bolt 208 rotates in the threaded opening (e.g., the threaded opening of the wedge block 204 in the depicted embodiment), the head of the bolt and/or the nut (depending on the direction) may be configured to apply a force to the outer block 206 opposite the force of the threading on the bolt to move the wedge block and the outer block relative to each other. In some embodiments, the blocks of the adjustable block assembly 200 may be made of metal, such as steel, though it will be understood that the blocks could be made of other suitable material. It will be appreciated that the relative movements described herein may be accomplished while altering the positions of one or more components without altering the adjustment properties (e.g., the adjustable block assembly 200 may be positioned on another side of the shaft assembly 300; the outer and inner blocks may be swapped and/or attached to other parts of the assembly; the adjustment mechanism may interconnect different blocks to drive the motion from a different position; etc.).

In some embodiments, the shaft assembly 300 includes a shaft 302 and one or more bearings 304. In some embodiments, the one or more bearings may be operably connected to the shaft; that is, the one or more bearings 304 may secure the shaft 302 in the shaft assembly 300 while permitting the shaft to rotate, such that the shaft moves with and is aligned by the bearings 304. In some embodiments, the bearings 304 may be operably attached to the mounting block 106. In some embodiments, the bearings 304 may be fixed to or otherwise integrated with the mounting block 106. In some embodiments, one or more bearing bolts 306A, 306B may operably attach the bearing 304 to the mounting block 106. In some embodiments, the one or more bolts 306A-B may be disposed through a corresponding pair of holes in the frame 102. In some embodiments, these one or more holes may be sized such that the one or more bolts 306A, 306B may slide laterally within the holes, such that the bearing may also slidably move along with the inner block 202 and the mounting block 106 relative to the frame. In some embodiments, a technician may need to loosen the one or more bolts 306A, 306B prior to manipulating the adjustable block assembly 200 to move the bearing 304 and then tighten the one or more bolts 306A, 306B once the bearing has been properly adjusted. In some embodiments, the shaft 302 may be a metal shaft, such as a steel or aluminum shaft. In some embodiments, a pair of fasteners 108A, 108B may be fixed to the mounting block 106 and positioned adjacent to the bearing 304. In some embodiments, the pair of fasteners 108A, 108B may be positioned on either side of the bearing 304 (the fasteners 108A, 108B may be seen in greater detail in the side, cutaway view shown in FIG. 4). The fasteners 108A, 108B may constrain the motion of the bearing 304 relative to the mounting block 106 to cause the bearing to move with the mounting block. In some embodiments, the fasteners 108A, 108B need not be firmly abutting the bearing.

Manipulation of the adjustable block assembly 200 to adjust the position of the shaft assembly 300 will now be described. The following description is for one adjustable block assembly 200 and one side of the shaft assembly 300, but it will be understood that the operation may be performed on the adjustable block assembly 200 on the other side of the shaft assembly 300, either simultaneously or in a separate operation.

According to various embodiments, manipulation of the adjustable assembly block 208 may be performed by manipulating the adjustment mechanism 208, which may control movement of the inner block 202 and/or the wedge block 204 relative to the outer block 206, while thereby controlling movement of the mounting block 106, the bearing 304, and the shaft 302. In some embodiments, the adjustment mechanism 208 may be "tightened" by rotating the mechanism 208 to the right (clockwise from the perspective of a technician standing behind the outer block 206), and in other embodiments, the adjustment mechanism 208 may be "loosened" by rotating the mechanism 208 to the left (counterclockwise from the perspective of a technician standing behind the outer block 206) depending upon the orientation of the threading and the relative position of the blocks and bearing.

In some embodiments, by loosening the adjustment mechanism 208, the wedge block 204 may slide axially along the length of the adjustment mechanism 208 towards the frame 102 (e.g., in a "second direction" not parallel to the first direction of ultimate movement of the bearing), the second engagement surface 216 of the wedge block 204 may slide along the first engagement surface 214 of the outer block 206 (moving closer to the frame 102), and the first slidable mounting component 218 may slide into the second slidable mounting component 220. As the adjustment mechanism 208 is loosened and the wedge block moves as described, the inner block 202 may slide with the mounting block 106, moving away from the outer block 206 and simultaneously moving the shaft 302 and bearing assembly 304 in the same direction. In some embodiments, the pair of fasteners 108A, 108B may operably engage with the bearing 304 to assist in moving the bearing 304 as it slides with the mounting block 106 and the inner block 202.

In some embodiments, by tightening the adjustment mechanism 208, the opposite of the loosening operation may occur. That is, the wedge block 204 may slide axially along the length of the adjustment mechanism 208 away from the frame 102, the second engagement surface 216 of the wedge block 204 may slide along the first engagement surface 214 of the outer block 206 (moving away from the frame 102), and the first slidable mounting component 218 may slide out of the second slidable mounting component 220. As the adjustment mechanism 208 is tightened and the wedge block moves as described, the inner block 202 may slide with the mounting block 106, moving toward the outer block 206 and simultaneously moving the shaft 302 and bearing assembly 304 in the same direction. As previously described, in some embodiments, the pair of fasteners 108A<108B may operably engage with the bearing 304 to assist in this movement.

The wedge block 204 may include a cross-sectional profile that is non-rectangular. Moreover, at least one of the first engagement surface 214 of the outer block 206 and the second slidable mounting component 220 of the inner block 202 may be disposed at a non-perpendicular angle to the first direction and the frame 102 surface relative to which the bearing moves, such that as the wedge block slides relative to the outer block, a distance between the outer block and the inner block changes due to the variable thickness of the wedge block 204 and the inclined surface(s) along which the wedge is translated.

Figure 5A:
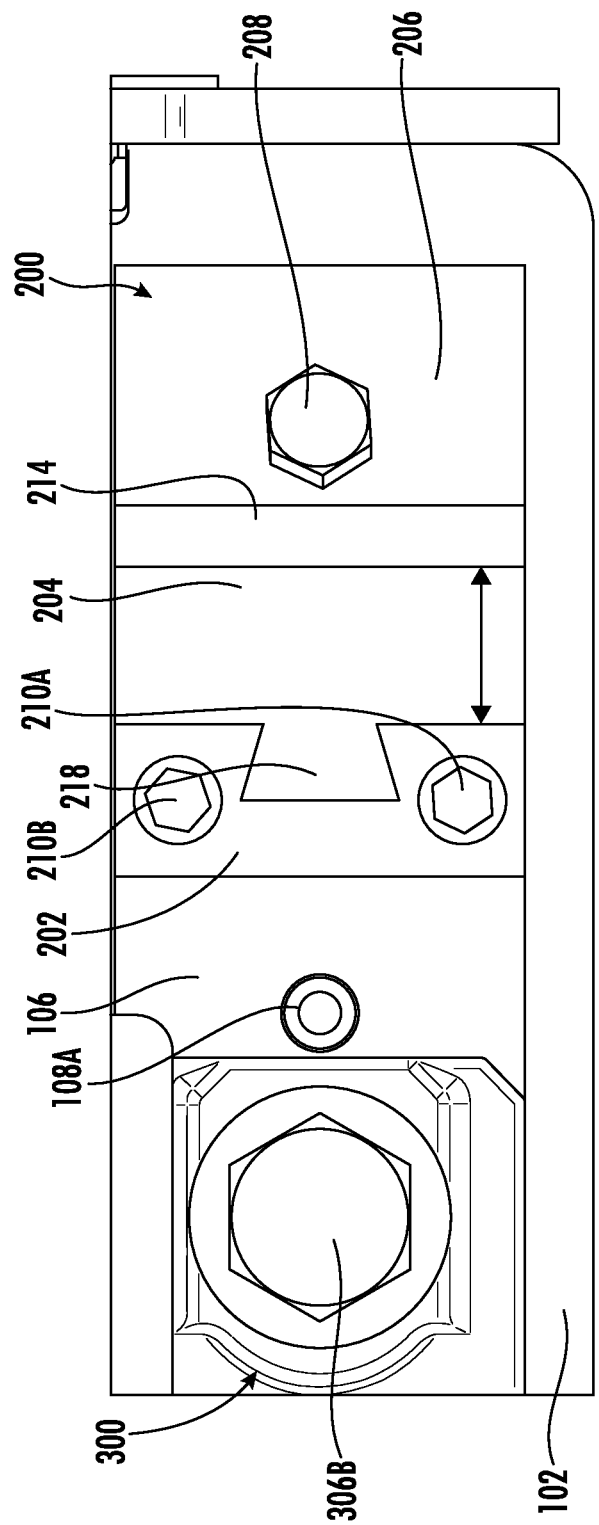
FIG. 5A is a top view of an example wedge block assembly and shaft assembly in a first position in accordance with various embodiments of the present disclosure.
Figure 5B:
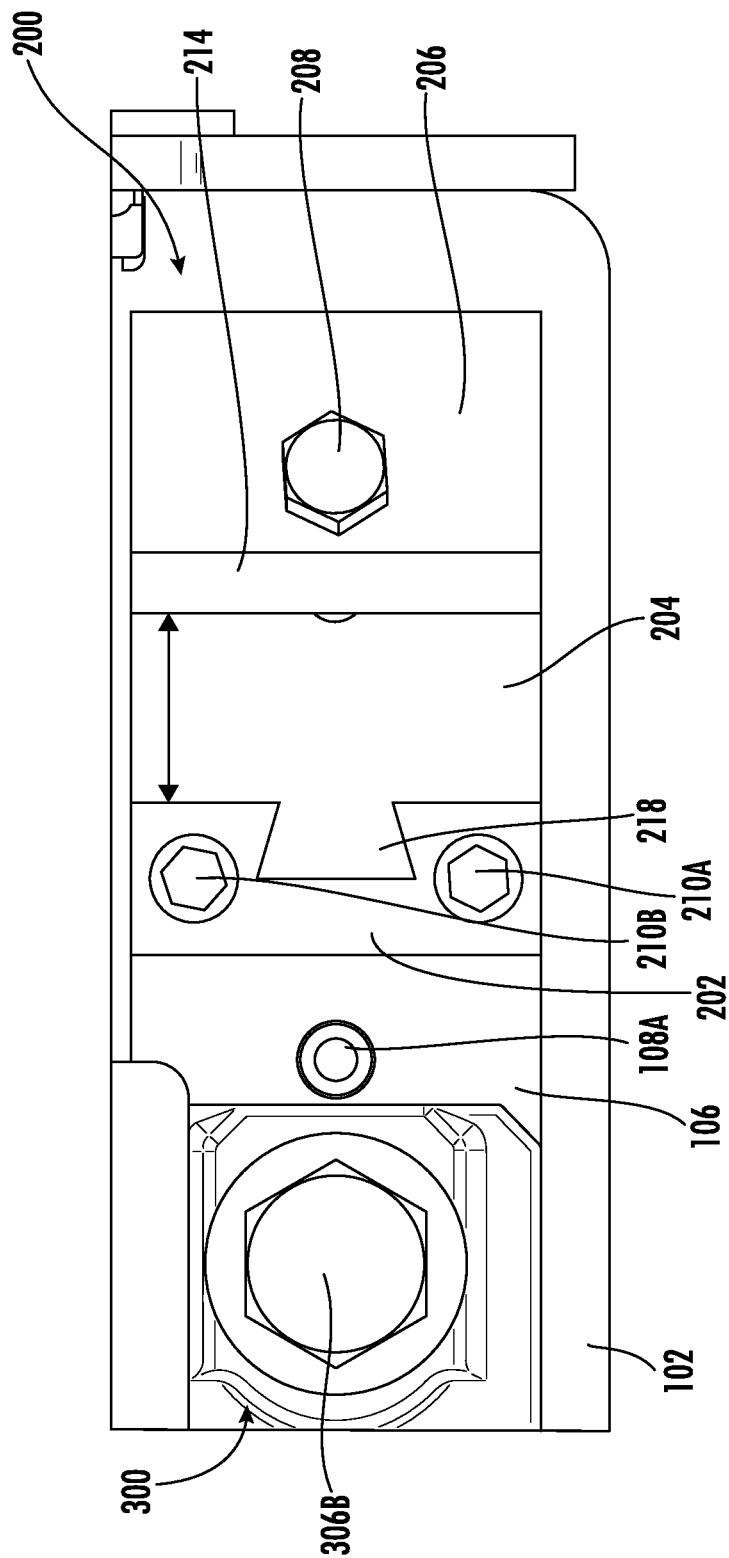
FIG. 5B is a top view of an example wedge block assembly and shaft assembly in a second position in accordance with various embodiments of the present disclosure.
Figure 6:
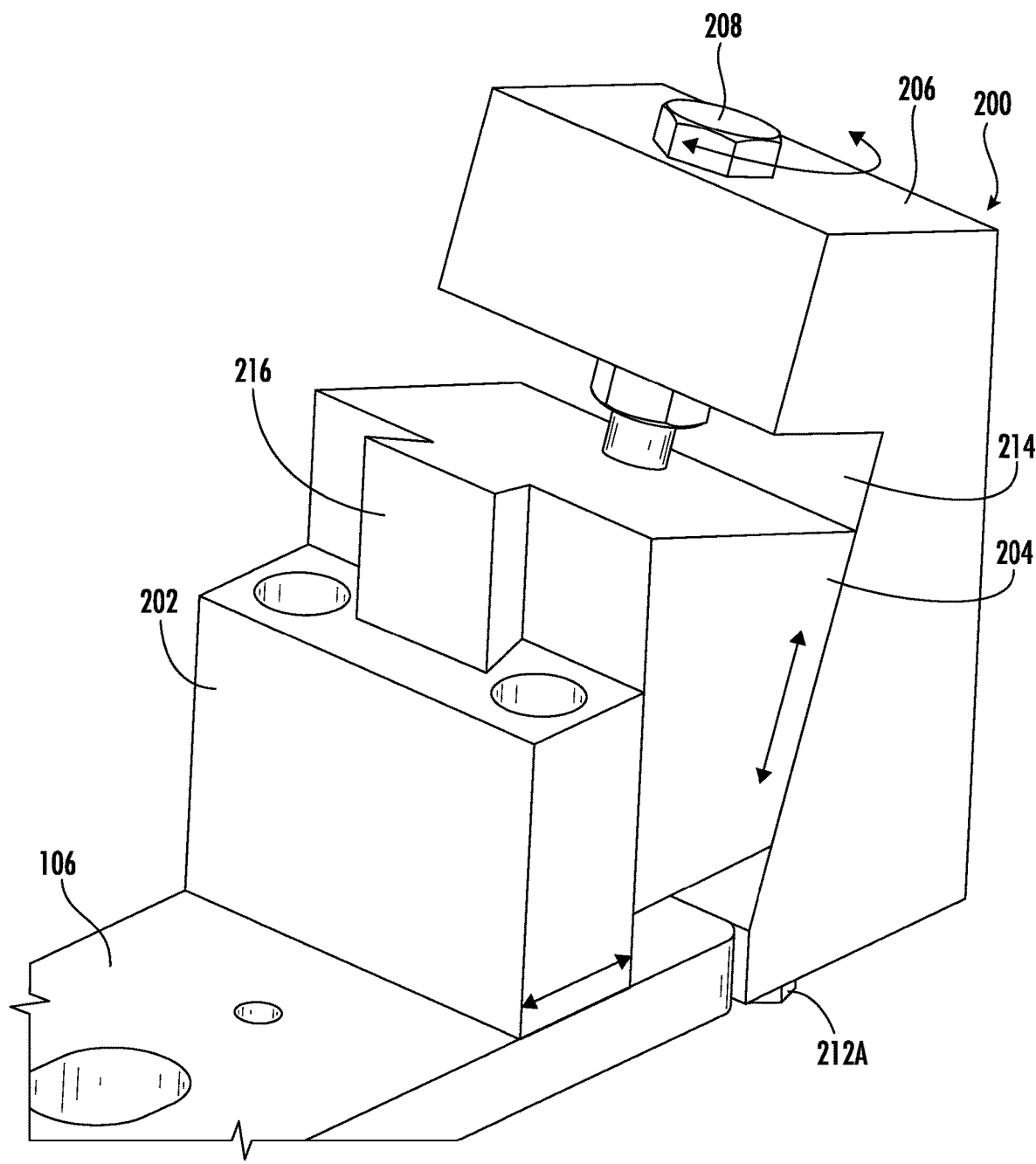
FIG. 6 is a first angled view of an example wedge block assembly in accordance with various embodiments of the present disclosure.

FIGS. 5A and 5B are top view of an example wedge block assembly 200 and shaft assembly 300 in accordance with various embodiments of the present disclosure. In some embodiments, FIG. 5A may be considered as an adjustable block assembly 200 and a shaft assembly 300 prior to "loosening" of the adjustment mechanism 208, and FIG. 5B may be considered as an adjustable block assembly 200 and a shaft assembly 300 after "loosening" of the adjustment mechanism 208. That is, the inner block 202 has moved away from the outer block 208. In other embodiments, though, FIG. 5B may be considered as an adjustable block assembly 200 and a shaft assembly 300 prior to "tightening" of the adjustment mechanism 208, and FIG. 5A may be considered as an adjustable block assembly 200 and a shaft assembly 300 after "tightening" of the adjustment mechanism 208. That is, the inner block 202 has moved toward the outer block 208.

Example Methods of Adjusting a Shaft for a Conveyor System

Figure 11:
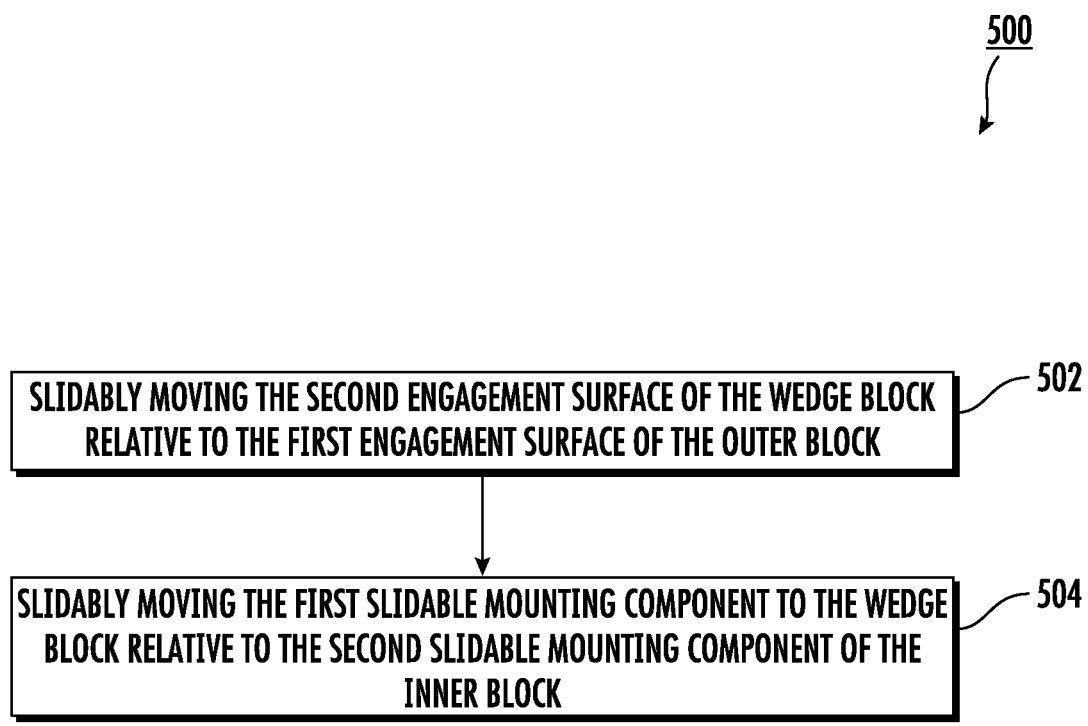
FIG. 11 is an example method of adjusting a shaft for a conveyor system in accordance with various embodiments of the present disclosure.

According to various embodiments, and as shown in at least FIG. 11, there is provided a method 500 of adjusting a shaft for a conveyor system. The steps of the method 500 are described in reference to the system, assemblies, and components as previously described. However, it will be understood that the method 500 may be performed with any suitable systems, assemblies, and components. In some embodiments, the method 500 may include a step 502 of slidably moving the second engagement surface of the wedge block relative to the first engagement surface of the outer block. In some embodiments, the method 500 may include a step 504 of slidably moving the first slidable mounting component of the wedge block relative to the second slidable mounting component of the inner block. In some embodiments, the method 500 may include additional steps, such as measuring a first distance between a first one of the two bearings and a first predetermined location on a frame of the conveyor assembly, measuring a second distance between the second one of the two bearings and a second predetermined location on the frame of the conveyor assembly, wherein the second predetermined location corresponds to the first predetermined location; and adjusting, by means of the wedge block, one of the two bearings to make the first and second distances equal. In some embodiments, the predetermined locations may be any location so long as the measurement may be repeated to the same location between adjustments of the bearing(s) position.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An adjustable block assembly comprising:
an outer block comprising a first engagement surface;
a wedge block comprising:
  a first slidable mounting component; and
  a second engagement surface configured to engage the first engagement surface;
an inner block comprising a second slidable mounting component configured to operably engage with the first slidable mounting component; and
an adjustment mechanism configured to adjust a distance between the outer block and the inner block along a first direction by translating the wedge block relative to both the outer block and the inner block along a second direction,
wherein the second direction is different than the first direction,
wherein the adjustment mechanism comprises a threaded shaft configured to operably connect the outer block and the wedge block to cause translation of the wedge block;
wherein translating the wedge block is configured to cause:
  the second engagement surface of the wedge block to slide relative to the first engagement surface of the outer block, and
  the first slidable mounting component of the wedge block to slide relative to the second slidable mounting component of the inner block.

2. The adjustable block assembly of claim 1, further comprising a mounting block, wherein the inner block is fixed to the mounting block, and wherein the mounting block and the inner block are configured to move together along the first direction.

3. The adjustable block assembly of claim 1, wherein the first slidable mounting component is a dovetail rail and the second slidable mounting component is a dovetail mount.

4. The adjustable block assembly of claim 1, wherein the wedge block further comprises a threaded section configured to receive the adjustment mechanism and the outer block further comprises a clearance hole.

5. The adjustable block assembly of claim 1, wherein the first engagement surface and the second engagement surface comprise angled surfaces, which are angled relative to the first direction.

6. The adjustable block assembly of claim 1, wherein the first slidable mounting component is a dovetail mount and the second slidable mounting component is a dovetail rail.

7. A conveyor system comprising:
a shaft assembly comprising a shaft and two bearings, wherein the shaft is operably connected to the two bearings;
a conveyor assembly configured to be driven by the shaft; and
two adjustable block assemblies, each connected to a respective one of the two bearings, each adjustable block assembly comprising:
  an outer block comprising a first engagement surface;
  a wedge block comprising a first slidable mounting component and a second engagement surface configured to engage the first engagement surface;
  an inner block comprising a second slidable mounting component configured to operably engage with the first slidable mounting component; and
  an adjustment mechanism configured to adjust a distance between the outer block and the inner block along a first direction by translating the wedge block relative to both the outer block and the inner block along a second direction,
wherein the second direction is different than the first direction,
wherein the adjustment mechanism comprises a threaded shaft configured to operably connect the outer block and the wedge block to cause translation of the wedge block,
wherein translating the wedge block is configured to cause:
  the second engagement surface of the wedge block to slide relative to the first engagement surface of the outer block, and
  the first slidable mounting component of the wedge block to slide relative to the second slidable mounting component of the inner block,
  wherein the inner block is fixedly connected, directly or indirectly, to the respective one of the two bearings.

8. The conveyor system of claim 7, wherein each outer block of the two adjustable block assemblies is configured to be stationary relative to a frame of the conveyor system during translation of the wedge block, and wherein the inner block is configured to translate relative to the outer block and the frame during translation of the wedge block.

9. The conveyor system of claim 7, wherein the first direction is parallel to a top surface of the conveyor assembly.

10. The conveyor system of claim 7, wherein the conveyor assembly further comprises two or more slats operatively connected by one or more chains.

11. The conveyor system of claim 7, wherein the two adjustable block assemblies are independently adjustable to align the shaft with the one or more of the conveyor assembly and a frame.

12. The conveyor system of claim 7, wherein the first slidable mounting component of each adjustable block assembly is a dovetail rail and the second slidable mounting component of each adjustable block assembly is a dovetail mount.

13. The conveyor system of claim 7, further comprising two mounting blocks, wherein each inner block of the two adjustable block assemblies is fixed to a respective one of the two mounting blocks, and wherein each inner block and each respective mounting block are configured to move together.

14. The conveyor system of claim 13, wherein each of the two mounting blocks further comprises a respective pair of fasteners, wherein the respective pair of fasteners is configured to engage a respective bearing of the two bearings during translation of the wedge block.

15. The conveyor system of claim 14, wherein each bearing of the two bearings is fixedly connected to a respective mounting block and configured to move with the respective mounting block.

16. The conveyor system of claim 15, wherein the two mounting blocks are attached to a frame member of the conveyor system, and wherein each mounting block of the two mounting blocks is slidable relative to the frame member during translation of the respective wedge block of the two adjustable block assemblies.

17. The conveyor system of claim 16, wherein the frame member comprises at least one slot and each mounting block of the two mounting blocks comprises at least one hole, wherein the at least one slot and the at least one hole are each configured to receive at least one fastener connecting the respective bearing of the two bearings to the frame member and the respective mounting block.

18. The conveyor system of claim 7, wherein the first slidable mounting component of each adjustable block assembly is a dovetail mount and the second slidable mounting component of each adjustable block assembly is a dovetail rail.

19. A method of adjusting a shaft for a conveyor system comprising:
providing the conveyor system comprising:
   a shaft assembly comprising the shaft and two bearings, wherein the shaft is operably connected to the two bearings;
   a conveyor assembly configured to be driven by the shaft; and
   two block assemblies, each connected to a respective one of the two bearings, each block assembly comprising:
      an outer block comprising a first engagement surface;
      a wedge block comprising a first slidable mounting component and a second engagement surface configured to engage the first engagement surface;
      an inner block comprising a second slidable mounting component configured to operably engage with the first slidable mounting component, wherein the inner block is fixedly connected, directly or indirectly, to the respective one of the two bearings; and
      an adjustment mechanism configured to adjust a distance between the outer block and the inner block along a first direction by translating the wedge block relative to both the outer block and the inner block along a second direction,
      wherein the second direction is different than the first direction;
      wherein the adjustment mechanism comprises a threaded shaft configured to operably connect the outer block and the wedge block to cause translation of the wedge block;
slidably moving the second engagement surface of the wedge block relative to the first engagement surface of the outer block; and
slidably moving the first slidable mounting component of the wedge block relative to the second slidable mounting component of the inner block.

20. The method of claim 19, further comprising:
measuring a first distance between a first one of the two bearings and a first predetermined location on a frame of the conveyor assembly;
measuring a second distance between the second one of the two bearings and a second predetermined location on the frame of the conveyor assembly, wherein the second predetermined location corresponds to the first predetermined location; and
adjusting, by means of the wedge block, one of the two bearings to make the first distance and the second distance equal.

* * * * *